US006427134B1

(12) United States Patent
Garner et al.

(10) Patent No.: US 6,427,134 B1
(45) Date of Patent: Jul. 30, 2002

(54) VOICE ACTIVITY DETECTOR FOR CALCULATING SPECTRAL IRREGULARITY MEASURE ON THE BASIS OF SPECTRAL DIFFERENCE MEASUREMENTS

(75) Inventors: Neil Robert Garner, Walsall; Paul Alexander Barrett, Ipswich, both of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/029,380

(22) PCT Filed: Jul. 2, 1997

(86) PCT No.: PCT/GB97/01780

§ 371 (c)(1), (2), (4) Date: Feb. 26, 1998

(87) PCT Pub. No.: WO98/01847

PCT Pub. Date: Jan. 15, 1998

(30) Foreign Application Priority Data

Jul. 3, 1996 (EP) ............................................ 96304920

(51) Int. Cl.[7] ............................................ G10L 15/20

(52) U.S. Cl. ....................... 704/233; 704/239; 704/226; 704/208; 455/428; 455/529; 379/406; 379/410

(58) Field of Search ................................ 704/233, 239, 704/238, 226, 208, 213, 214, 270, 275; 455/428, 569; 379/406, 410, 390

(56) References Cited

U.S. PATENT DOCUMENTS 4,357,491 A 11/1982 Daaboul et al.
4,672,669 A 6/1987 DesBlache et al.
4,720,802 A * 1/1988 Damoulaskis et al. ...... 704/226

(List continued on next page.)

FOREIGN PATENT DOCUMENTS

| | | |
|---|---|---|
| EP | A 0 335 521 | 10/1989 |
| EP | 0 335 521 A | 10/1989 |
| EP | A 0 392 412 | 10/1990 |
| EP | 0 435 458 A | 7/1991 |
| EP | 0 439 073 A | 7/1991 |
| EP | 0 538 536 A | 4/1993 |
| EP | A 0 538 536 | 4/1993 |
| EP | A 0 571 079 | 11/1993 |
| WO | A 93 13516 | 7/1993 |
| WO | 96 34382 A | 10/1996 |

OTHER PUBLICATIONS

Dendrinos M et al.: "Voice Activity Detection in Coloured–Noise Environment Through Singular Value Decomposition" Proceedings of the 5th International Conference on Signal Processing Applications and Technology, Proceedings of 5th International Conference on Signal Processing Applications and Technology, Dallas, TX, USA, Oct. 1994, 1994, Waltham, MA, USA, DSP Associates, USA, pp. 137–141 vol. 1.

(List continued on next page.)

*Primary Examiner*—Vijay B Chawan
(74) *Attorney, Agent, or Firm*—Nixon & Vanderhye, P.C.

(57) ABSTRACT

A voice activity detector suitable for deployment in a mobile phone apparatus is disclosed. An advantage of the voice activity detector is that it is better able to provide a decision (79) as to whether an input signal (19) consists of noise (which it is not desired to transmit) or comprises speech or information tones (which are required to be transmitted), especially in noisy environments. The voice activity detector includes a number of components, in particular an auxiliary voice activity detector (3). The auxiliary voice activity detector (3) distinguishes between noise and speech on the basis that the spectrum of speech changes more rapidly than that of noise. This results in the auxiliary detector (3) rarely mistaking a speech signal to be a noise signal. Hence, a very reliable noise template (421) is obtained. For this reason, the auxiliary detector (3) is also useful in noise reduction applications. The voice activity detector also uses a neural net classifier (7).

17 Claims, 5 Drawing Sheets

U.S. PATENT DOCUMENTS

| | | | | | |
|---|---|---|---|---|---|
| 5,276,765 | A | * | 1/1994 | Freeman et al. | 704/233 |
| 5,621,854 | A | * | 4/1997 | Hollier | 704/228 |
| 5,657,422 | A | * | 8/1997 | Janiszewski et al. | 704/226 |
| 5,706,394 | A | * | 1/1998 | Wynn | 704/219 |
| 5,737,716 | A | * | 4/1998 | Bergstrom et al. | 704/202 |
| 5,749,067 | A | * | 5/1998 | Barrett | 704/233 |
| 5,794,188 | A | * | 8/1998 | Hollier | 704/228 |
| 5,890,104 | A | * | 3/1999 | Hollier | 704/201 |
| 5,963,901 | A | * | 10/1999 | Vahatalo et al. | 704/233 |
| 5,991,718 | A | * | 11/1999 | Malah | 704/233 |
| 6,061,647 | A | * | 5/2000 | Barrett | 704/208 |

OTHER PUBLICATIONS

Barrett et al, "Search Transmission Over Digital Mobile Radio Channels", BT Technology Journal, 1996, 14.(1), pp. 45–56.

Boll, "Speech Enhancement in the 1980's: Noise Suppression with Pattern Matching", Advances in Speech Processing, Dekker, 1992.

Freeman et al, "The Voice Activity Detector of the Pan–European Digital Mobile Telephone Service", IEEE, 1989, CH2673–2.

Pawlewski, "Advances in Telephony–Based Speed Recognition", BT Technol J., vol. 14, No. 1, Jan. 1996.

Lippmann, "An Introduction to Computing with Neural Nets", IEEE ASSP Magazine, Apr. 1987, pp. 4–22.

Lockwood et al, "Noise Reduction for Speech Recognition in Cars: Non Linear Spectral Subtraction/Kalman Filtering", Proc. Eurospeech, 1991, p 83–86.

Lockwood et al, "Root Adaptive Homomorphic Deconvolution Schemes for Speech Recognition in Noise", Proc. ICASSP, Apr. 1994, vol. 1.

Gong, "Speech Recognition in Noisy Environments", Speech Communication, 1995.

Rabiner et al, "Evaluation of a Statistical Approach to Voiced–Unvoiced–Silence Analysis for Telephone–Quality Speech", The Bell System Technical Journal, vol. 56, No. 3, Mar. 1977.

Atal et al, "A Patent Recognition Approach to Voiced–Unvoiced–Silence Classification with Applications to Speech Recognition", IEEE Trans on Acoustics, Speech, and Signal Processing, vol. ASSP–24, No. 3, Jun. 1976.

* cited by examiner

VOICE ACTIVITY DETECTOR FOR CALCULATING SPECTRAL IRREGULARITY MEASURE ON THE BASIS OF SPECTRAL DIFFERENCE MEASUREMENTS

BACKGROUND OF THE INVENTION

1. Field of the Invention

The present invention relates to a voice activity detector. It has particular utility in relation to an auxiliary voice activity detector comprised in a main voice activity detector and also when comprised in a noise reduction apparatus. A main voice activity detector incorporating such an auxiliary voice detector is especially suitable for use in mobile phones which may be required to operate in noisy environments.

2. Description of Related Art

Because of the limited regions of the electromagnetic spectrum which have been made available for use by cellular radio systems, the strong growth in the number of mobile phone users over the last decade has meant that cellular radio equipment suppliers have had to find ways to increase the efficiency with which the available electromagnetic spectrum is utilised.

One way in which this aim can be achieved is to reduce the size of the cells within the cellular radio system. However, it is found that cell size can only be reduced by so much before the level of interference from nearby cells (co-channel interference) becomes unacceptably high. In order to reduce co-channel interference, a technique called discontinuous transmission is used. This technique involves arranging the mobile phone to transmit speech-representing signals only when the mobile phone user is speaking and is based on the observation that, in a given conversation, it is usual for only one of the parties to speak at any one time. By implementing discontinuous transmission, the average level of co-channel interference can be reduced. This, in turn, means that the cell size in the system can be reduced and hence that the system can support more subscribers.

Another advantage of only transmitting sound-representing signals when the mobile phone user is speaking is that the lifetime of the electric battery within the mobile phone handset is increased.

A voice activity detector is used to enable discontinuous transmission. The purpose of such a detector is to indicate whether a given signal consists only of noise, or whether the signal comprises speech. If the voice activity detector indicates that the signal to be transmitted consists only of noise, then the signal is not transmitted.

Many mobile phones today use a voice activity detector similar to that described in European Patent No. 335521. In the voice activity detector described therein, the similarity between the spectrum of an input sound-representing signal and the spectrum of a noise signal is measured. The noise spectrum to be used in this comparison is obtained from earlier portions of the input signal which were determined to be noise. That judgement is made by an auxiliary voice activity detector which forms a component of the main voice activity detector. Since it is important that signals comprising speech are transmitted by the mobile phone and since the decision of the main voice activity detector is based on signals identified as noise by the auxiliary voice detector, it is desirable that the auxiliary voice detector tends, in borderline situations, towards a determination that the signal comprises speech. The proportion of a conversation which is identified as speech by a voice activity detector is called the voice activity factor (or simply "activity") of the detector.

The proportion of conversation which in fact comprises speech is typically in the range 35% to 40%. So, ideally, a main voice activity detector will have art activity lying within this range or slightly above it, whereas an auxiliary voice activity detector can have a significantly higher activity.

Although the known voice activity detectors exhibit good performance in a variety of environments, their performance has been found to be poor in noisy environments. A mobile phone may be required to operate in cars, in city streets, in busy offices, in train stations or in airports. There is therefore a requirement for a voice activity detector that can operate reliably in noisy environments.

BRIEF SUMMARY OF THE INVENTION

According to the first aspect of the present invention there is provided a voice activity detector comprising:

means arranged in operation to calculate at least one first spectral difference measure indicative of the degree of spectral similarity in a pair of time segments of a signal, one of the time segments of the pair lagging the other by a first time interval;

means arranged in operation to calculate at least one second spectral difference measure indicative of the degree of spectral similarity in a pair of time segments of a signal, one of the time segments of the pair lagging the other by a second time interval which differs from said first time interval;

means arranged in operation to calculate a spectral irregularity measure on the basis of at least said first and second spectral difference measures; and means arranged in operation to compare said spectral irregularity measure with a threshold measure.

This voice activity detector has the advantage that it provides a reliable determination that an input signal consists of noise. As stated above, this is a desirable property for an auxiliary voice activity detector which is used to identify signals which are used as noise templates in other processes carried out in an apparatus. Also, by combining spectral difference measures derived in relation to different time intervals, a voice activity detector according to the present invention takes into account the degree of stationarity of the signal over different time intervals. For example, if a first spectral difference measure were to be calculated in relation to a first relatively long time interval and a second spectral difference measure were to be calculated in relation to a relatively short time interval, then both the short-term and long-term stationarity of the signal would influence a spectral irregularity measure which combines the first and second spectral difference measures. Since the spectrum of noise, unlike speech, is stationary at least over time intervals ranging from 80 ms to 1 s, the voice activity detector of the present invention provides a robust performance in noisy environments.

Preferably, the predetermined length of time is in the range 400 ms to 1 s. This has the advantage that the relatively rapidly time-varying nature of a speech spectrum can be best discriminated from the relatively slowly time-varying nature of a noise spectrum.

Preferably, said spectral irregularity measure calculating means are arranged in operation to calculate a weighted sum of said spectral difference measures. This has the advantage that, in making a speech/noise decision, more weight can be given to spectral difference measures derived from time intervals over which the difference in stationarity between speech spectra and noise spectra is most pronounced.

According to a second aspect of the present invention there is provided a voice activity detector including:

a voice activity detector according to the first aspect of the present invention operable as an auxiliary voice activity detector.

Since the auxiliary noise detector has a high activity, a determination that an input signal consists of noise can be relied on to be correct. Furthermore, because the correct functioning of the main voice activity detector relies on the auxiliary voice activity detector correctly identifying a noise signal, a voice activity detector according to the second aspect of the present invention makes a reliable determination of whether a signal comprises speech or consists only of noise.

According to a third aspect of the present invention there is provided a noise reduction apparatus comprising:

a voice activity detector according to the first aspect of the present invention;

means arranged in operation to provide an estimated noise spectrum on the basis of one or more spectra obtained from respective time segments determined to consist of noise by said voice activity detector; and means arranged in operation to subtract said estimated noise spectrum from spectra obtained from subsequent time segments of said signal.

It is known by those skilled in the art that the technique of spectral subtraction only works well if the noise which is to be subtracted from the signal to be enhanced is stationary in its nature. This means that a combination of a spectral subtraction device and a voice activity detector according to the first aspect of the present invention forms a particularly effective noise reduction apparatus, since the operation of the voice activity detector according to the first aspect of the present invention means that an input signal will be determined to consist of noise only if that noise signal has been largely stationary within the predetermined length of time.

Generally, any apparatus which requires a reliable noise template will benefit from the inclusion of a voice activity detector according to the first aspect of the present invention.

According to a fourth aspect of the present invention, there is provided a voice activity detector comprising means arranged in operation to extract feature values from an input signal and neural net means arranged in operation to process a plurality of said feature values to output a value indicative of whether said input signal consists of noise.

An advantage of this apparatus is that a neural net, once trained, can model relationships between the input parameters and the output decision which cannot be easily determined analytically. Although the process of training the neural net is labour intensive, once the neural net has been trained, the computational complexity of the algorithm is less than that found in known algorithms. This is of course advantageous in relation to a product such as a voice activity detector which is likely to be produced in large numbers.

Preferably, the input parameters to the neural net include cepstral coefficients derived from the signal to be transmitted. It has been found that these are useful parameters in making the distinction between speech and noise.

According to a fifth aspect of the present invention there is provided a method of voice activity detection comprising the steps of:

calculating at least one first spectral difference measure indicative of the degree of spectral similarity in a pair of time segments of a signal, one of the time segments of the pair lagging the other by a first time interval;

calculating at least one second spectral difference measure indicative of the degree of spectral similarity in a pair of time segments of a signal, one of the time segments of the pair lagging the other by a second time interval which differs from said first time interval;

calculating a spectral irregularity measure on the basis of at least said first and second spectral difference measure;

comparing said spectral irregularity measure with a threshold measure; and determining whether said signal consists of noise on the basis of the comparison.

This method has the advantage that the discrimination between noise and speech signals is robust.

According to a sixth aspect of the present invention there is provided a method of enhancing a spectrum representing the value of a spectral characteristic at a succession of predetermined frequencies, said enhancement comprising the steps of:

for each of said predetermined frequencies, comparing the value of said spectral characteristic at said frequency with the value of said characteristic at neighbouring frequencies and calculating an adjustment to said predetermined frequency spectral value, said calculation being such that the adjustment is increased on said predetermined frequency spectral value being greater than either of said neighbouring frequency spectral values and is decreased on said predetermined frequency spectral value being less than either of said neighbouring frequency spectral values; and adjusting each of said spectral values within the spectrum in accordance with said calculated adjustment.

BRIEF DESCRIPTION OF THE DRAWINGS

By way of example only, specific embodiments of the present invention will now be described in relation to the accompanying drawings, in which.

DETAILED DESCRIPTION OF THE INVENTION

Figure 1:
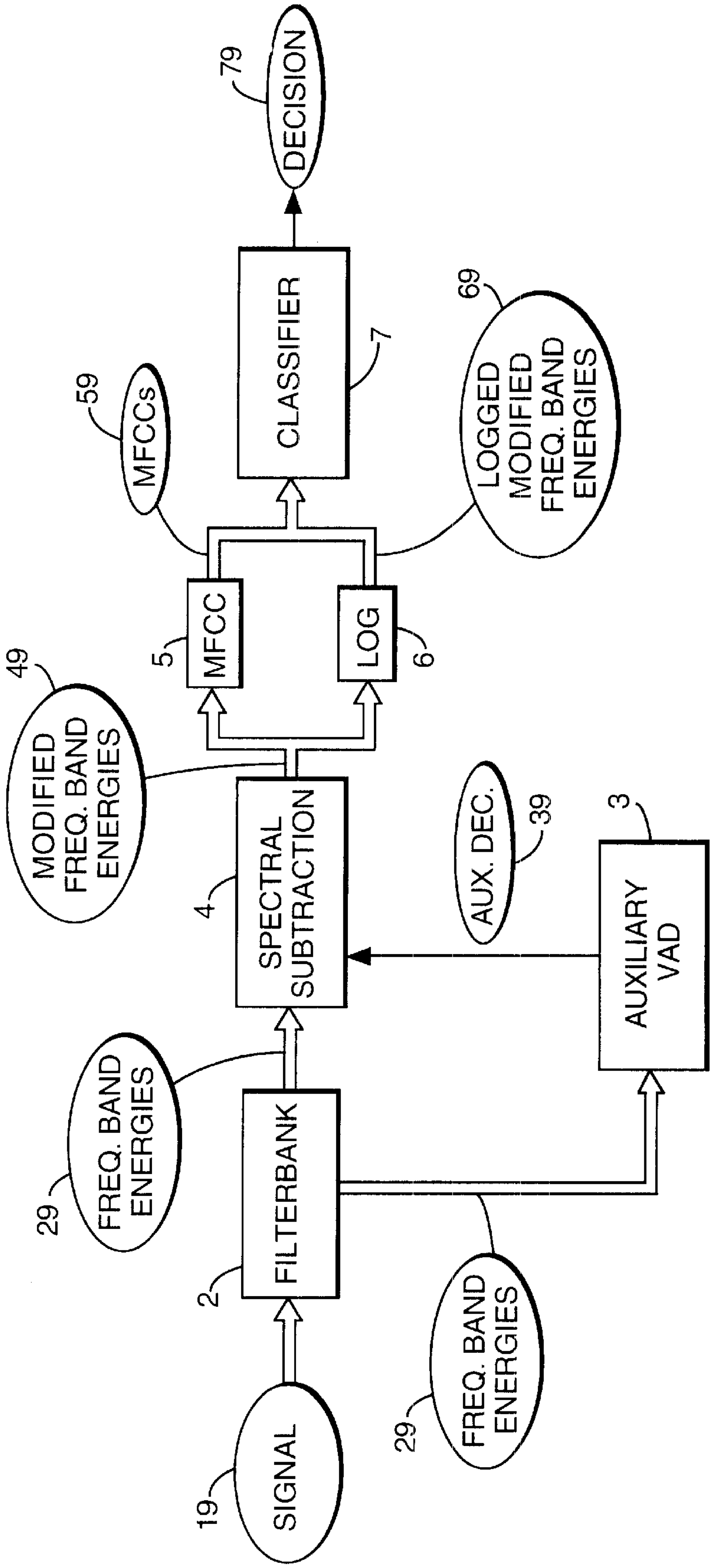
FIG. 1 is a block diagram illustrating the operation of the voice activity detector which forms a first embodiment.

The voice activity detector illustrated in FIG. 1 is arranged for use in a mobile phone apparatus and inputs a signal 19 before carrying out a series of processes 2,3,4,5,6,7 (each represented as a rectangle) on the signal in order to arrive at a decision 79 as to whether the input signal consists only of noise. At the end of each process 2,3,4,5,6,7 a resultant parameter or parameter set 29,39,49,59,69,79 (each represented as an ellipse) is produced. Each of these processes 2,3,4,5,6,7 can be carried out by a suitable Digital Signal Processing integrated circuit, such as the AT&T DSP32C floating point 32-bit processor.

The input to the voice activity detector is a digital signal 19 which represents voice/information tones and/or noise. The signal 19 is derived from an analogue signal at a rate of 8 kHz and each sample is represented by 13 bits. The signal 19 is input to the voice activity detector in 20 ms frames, each of which consists of 160 samples.

The signal 19 is input into a filterbank process 2 which carries out a 256-point Fast Fourier Transform on each input frame. The output of this process 2 is thirty-two frequency band energies 29 which represent the portion of the power in the input signal frame which falls within each of the thirty-two frequency bands bounded by the following values (frequencies are given in Hz): 100,143,188,236,286,340, 397,457,520,588,659,735,815,900,990,1085,1186, 1292, 1405,1525,1625,1786,1928,2078,2237,2406,2584,2774, 2974,3186, 3410,3648,3900.

The first frequency band therefore extends from 100 Hz to 143 Hz, the second from 143 Hz to 188 Hz and so on. It will be seen that the lower frequency bands are relatively narrow in comparison to the higher frequency bands.

The frequency band energies 29 output by the filterbank 2 are input to an auxiliary voice activity detector 3 and to a spectral subtraction process 4.

Figure 2:
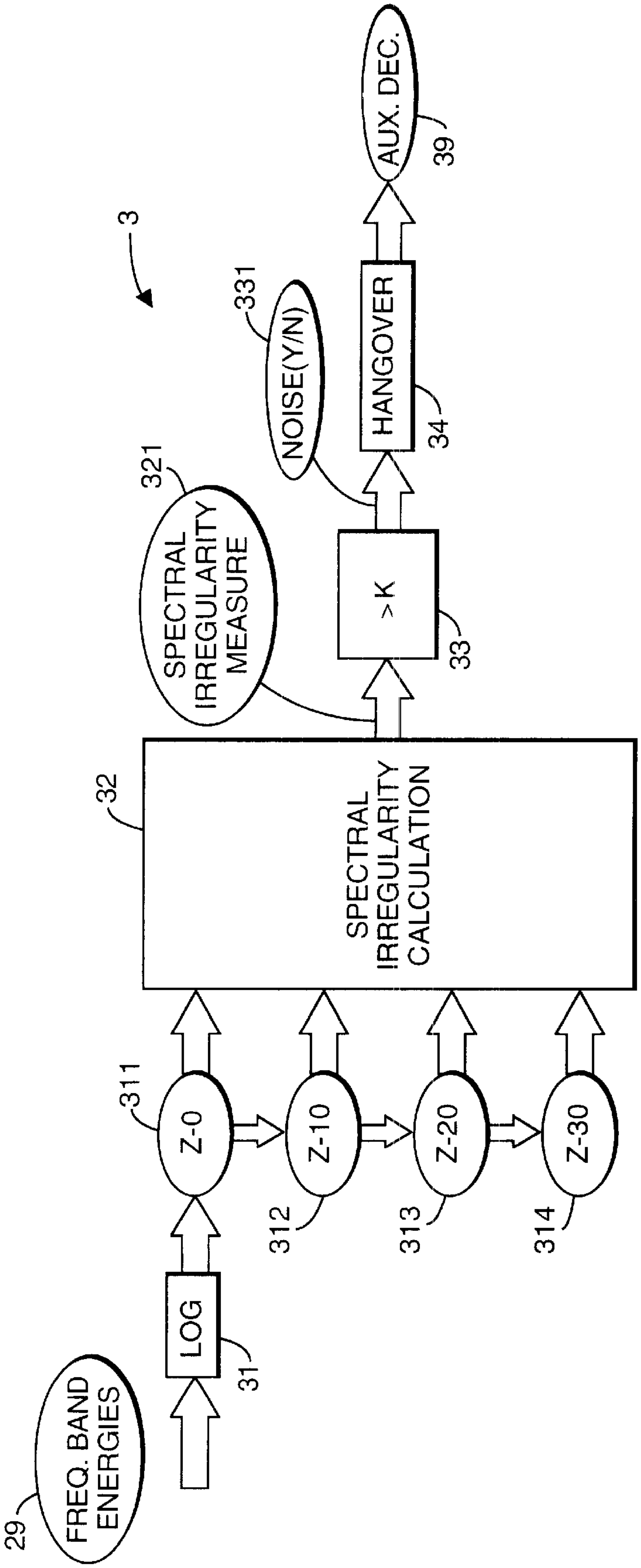
FIG. 2 is a block diagram illustrating the operation of the auxiliary voice activity detector which forms a component of the voice activity detector of FIG. 1.

Turning now to FIG. 2, the auxiliary voice activity detector 3 inputs the frequency band energies 29 and carries out a series of processes 31,32,33,34 to provide an auxiliary decision 39 as to whether the signal frame 19 consists only of noise.

The first process used in providing the auxiliary decision 39 is the process 31. The process 31 involves taking the logarithm to the base ten of each of the frequency band energies 29 and multiplying the result by ten to provide thirty-two frequency band log energies 311. The log energies from the previous thirty input signal frames are stored in a suitable area of the memory provided on the DSP IC.

The spectral irregularity calculating process 32 initially inputs the log energies 311 from the current input signal frame 19 together with the log energies 314, 313, 312 from first, second and third signal frames, respectively occurring thirty frames (i.e. 600 ms), twenty frames (i.e. 400 ms), ten frames (i.e. 200 ms) before the current input signal frame. The magnitude of the difference between the log energies 311 in each of the frequency bands for the current frame and the log energies 312 in the corresponding frequency band in the third frame is then found. The thirty-two difference magnitudes thus obtained are then summed to obtain a first spectral difference measure. In a similar way, second, third and fourth spectral difference measures are found which are indicative of the differences between the log energies 313, 312 from the second and third frames, the log energies 314, 313 from the first and second frames and the log energies 314, 311 from the first and current frames respectively. It will be seen that the first, second and third spectral difference measures are measures of differences between frames which are 200 ms apart. The fourth spectral difference measure is a measure of the difference between frames which are 600 ms apart. The first to fourth spectral difference measures are then added together to provide a spectral irregularity measure 321. The spectral irregularity measure therefore reflects both the stationarity of the signal over a 200 ms interval and the stationarity of the signal over a 600 ms interval.

Although, in this embodiment, the spectral irregularity measure is formed from a simple sum of the four spectral difference measures, it should be realised that a weighted addition might be performed instead. For example, the first, second and third spectral difference measures could be given a greater weighting than the fourth spectral difference measure or vice-versa. It will be realised by those skilled in the art that the effect of having three measures relating to a 200 ms interval and only one relating to a 600 ms interval is to provide a spectral irregularity measure were more weight is placed on spectral differences occurring over the shorter interval.

The spectral irregularity measure 321 is then input to a thresholding process 33 which determines whether the measure 321 exceeds a predetermined constant K. The output of this process is a noise condition which is true if the measure 321 is less than the predetermined constant and false otherwise. The noise conditions obtained on the basis of the previous two frames are stored in a suitable location in memory provided on the DSP IC. The noise condition is input to the hangover process 34 which outputs an auxiliary decision 39 which indicates that the current signal frame consists of noise only if the noise condition is found to be true and if the noise condition was also true when derived from the previous two frames. Otherwise the auxiliary decision indicates that the current frame comprises speech.

The present inventors have found that the spectral characteristics of a signal which consists of noise change more slowly than the spectral characteristics of a signal which comprises speech. In particular, the difference between the spectral characteristics of a noise signal over an interval of 400 ms to 1 s is significantly less than a corresponding difference in relation to a speech signal over a similar interval. The auxiliary voice activity detector (FIG. 2) uses this difference to discriminate between input signals which consist of noise and those which comprise speech. It is envisaged that such a voice activity detector could be used in a variety of applications, particularly in relation to noise reduction techniques where an indication that a signal is currently noise might be needed in order to form a current estimate of a noise signal for subsequent subtraction from an input signal.

Figure 3:
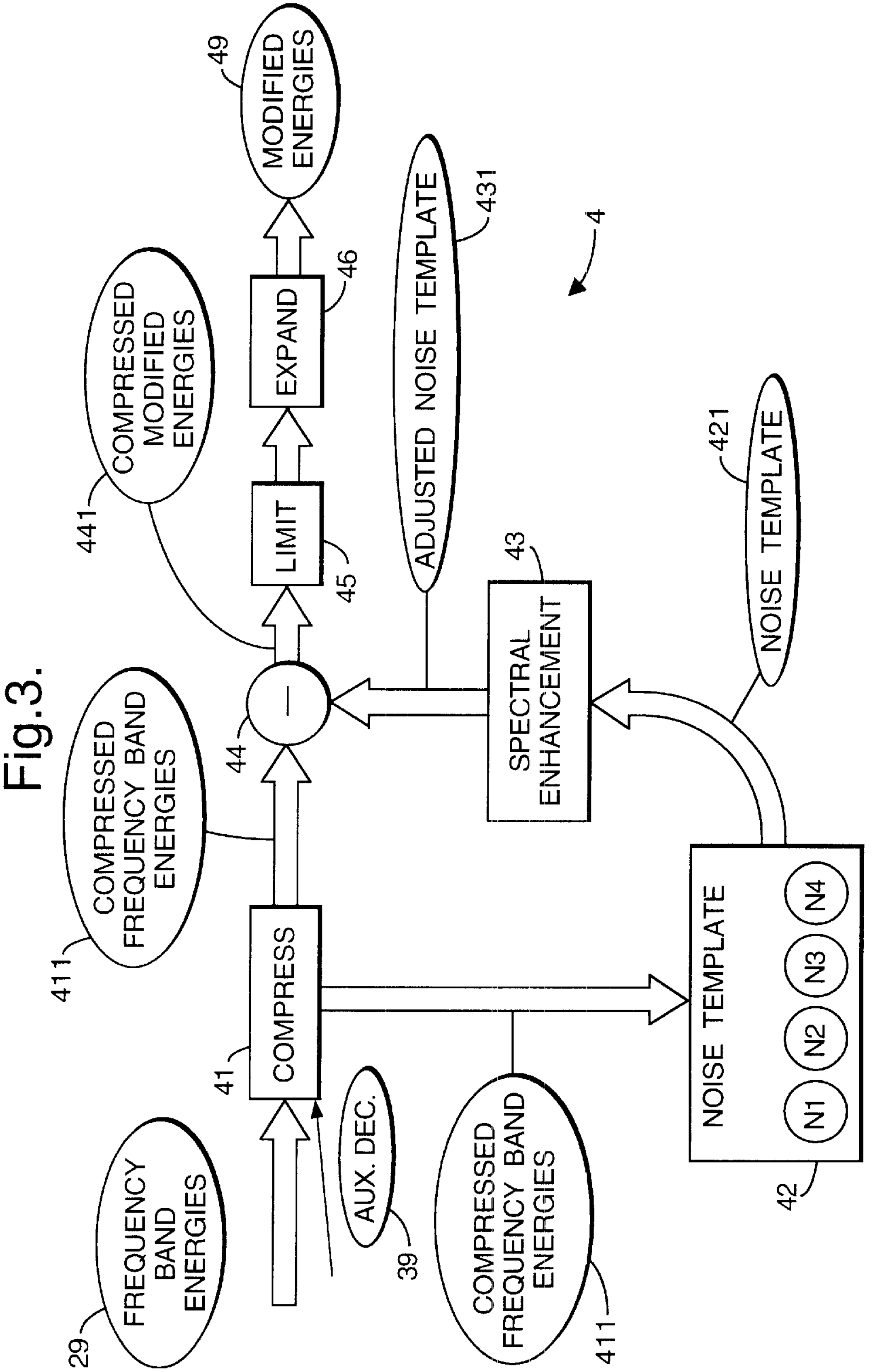
FIG. 3 is a block diagram illustrating the operation of the spectral subtraction component.

Returning to FIG. 1, the auxiliary decision 39 output by the auxiliary voice activity detector (FIG. 2) is input to the spectral subtraction process 4 together with the frequency band energies 29. The spectral subtraction process is shown in detail in FIG. 3. Firstly, the frequency band energies 29 are compressed in the compress process 41 by raising them to the power 5/7. The compressed frequency band energies are then input to the noise template process 42. The compressed frequency band energies derived from the current input signal frame N1 and the compressed frequency band energies N2,N3,N4 derived from the previous three frames are stored, together with the auxiliary decision relating to those frames in four fields in memory on the DSP IC. If the current and the previous three input signal frames have been designated as noise, the four compressed frequency band energies N1,N2,N3,N4 are averaged in order to provide a noise template 421.

Each time the noise template 421 is updated, it is inputted to the spectral enhancement process 43. The spectral enhancement process comprises a number of enhancement stages. The nth stage of enhancement results in an n-times enhanced spectrum. Hence, the first stage of enhancement converts an initial noise template to a once-enhanced noise template, which is input to a second stage which provides a twice-enhanced noise template, and so on until at the end of the eighth and final stage an eight-times enhanced noise template results. Each enhancement stage proceeds as follows.

Firstly, the difference between the compressed energy value relating to the lowermost (first) frequency band and the compressed energy value relating to the second frequency band is calculated. Thereafter, the difference between the compressed energy value relating to the second frequency band and the third frequency band is calculated. Each corresponding difference is calculated up until the difference between the thirty-first frequency band and the thirty-second frequency band. These differences are stored in a suitable location in memory on the DSP IC.

In each enhancement stage, the input energy value of each frequency band of the input noise template is adjusted to increase the difference between that energy value and the energy values associated with the neighbouring frequency bands. The differences used in this calculation are those based on the input energy values, rather than the adjusted values produced during the current enhancement stage.

In more detail, in each enhancement stage, an adjusted first frequency band energy value is produced by adjusting the input first frequency band energy value by 5% of the magnitude of the difference between the input first frequency band energy value and the input second frequency band energy value. The adjustment is chosen to be an increase or a decrease so as to be effective to increase the difference between the two energy band values. Since the adjustment to the input second frequency band energy value depends on two neighbouring frequency band energy values, the adjustment is calculated in two steps. Firstly, a part-adjusted second frequency band energy value is produced by carrying out a 5% adjustment on the basis of the difference between the second and third frequency band energy values. The second part of the adjustment of the second frequency band energy value is then carried out in a similar way on the basis of the difference between the second and third frequency band energy values. This process is repeated for each of the other frequency-bands save for the thirty-second frequency band energy value which has only one neighbouring frequency band energy value. The adjustment in this case is analogous to the adjustment of the first frequency band energy value.

It will be realised that if one of the neighbouring frequency band energy values is higher than the frequency band value being adjusted, and the other is lower, then the two parts of the adjustment will counteract one another.

In a second stage of the spectral enhancement process 43, a similar process of adjustment occurs to provide a twice-enhanced noise template on the basis of the once-enhanced noise template. Once all eight enhancement stages have been carried out, each of the frequency band energy values is multiplied by a scaling factor, for example, 0.9. The present inventors have found that the introduction of the spectral enhancement process 43 means that the scaling factor can be reduced from a typical value for noise reduction applications (e.g. 1.1) without introducing a 'musical' spectral subtraction noise.

The adjusted noise template 431 output by the spectral enhancement process 43 exhibits more pronounced harmonics than are seen in the unmodified noise template 421. In this way, the spectral enhancement process 43 models the process known as 'lateral inhibition' that occurs in the human auditory cortex. This adjustment has been found to improve the performance of the main voice activity detector (FIG. 1) in situations where the signal-to-background-noise ratio is greater than 10 dB.

In the subtraction process 44 the adjusted noise template values 431 are subtracted from the corresponding values in the frequency band compressed energies 411 derived from the current input signal frame to provide compressed modified energies 441.

The compressed modified energies 441 are then input to a limiting process 45 which simply sets any compressed modified energy value which is less than 1 to 1. Once a lower limit has been introduced in this way, each of the compressed modified energy values is raised in an expansion step 46 to the power 1.4 (i.e. the reciprocal of the compression exponent of step 41) to provide the modified frequency band energies 49.

Referring again to FIG. 1, the modified frequency band energies 49 are then input to a Mel Frequency Cepstral Coefficient calculating process 5 which calculates sixteen Mel Frequency Cepstral Coefficients for the current input signal frame on the basis of the modified frequency band energies 49 for the current input signal frame.

In a logarithm-taking process 6, similar operations to those carried out in relation to the process 31 are carried out on the modified frequency band energies 49 to provide logged modified frequency band energies 69.

The classification process 7 is carried out using a fully connected multilayer perceptron algorithm. The weights to be used in this algorithm are obtained by training the algorithm using a back-propagation algorithm with momentum ($\alpha$=100, $\epsilon$=0.05) using 6545 frames half of which are noise and half of which are speech. One hundred samples of training data are presented before each weight update and the training data is passed through two hundred times.

Figure 4:
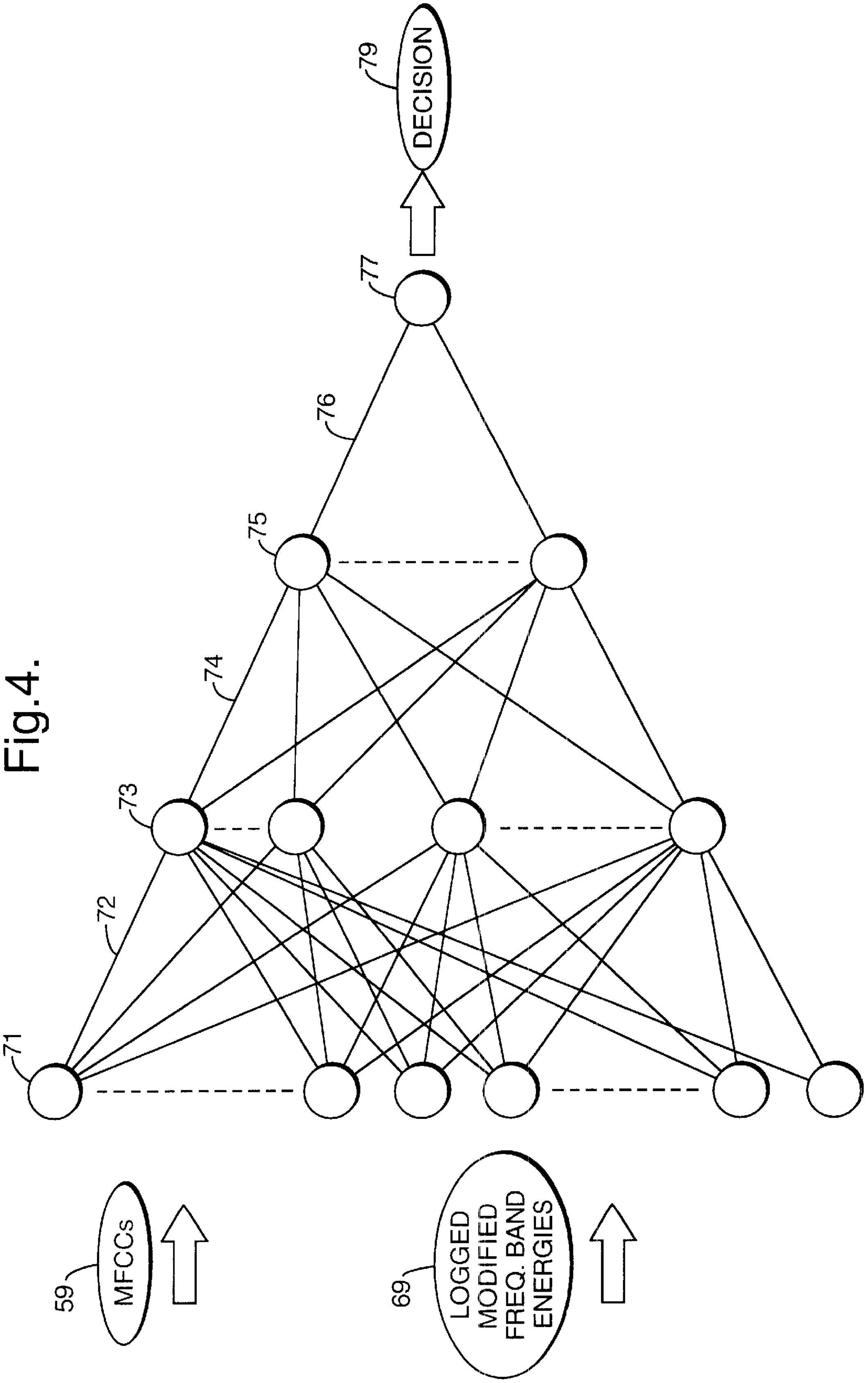
FIG. 4 is a diagram illustrating the operation of the classifier component.

Referring to FIG. 4, the multilayer perceptron has forty-eight input nodes 71. The sixteen Mel Frequency Cepstral Coefficients 59 and thirty-two logged modified frequency band energies 69 are normalised by means not shown so as to lie between 0 and 1 before being input to respective input nodes. Each of the input nodes 71 is connected to every one of twenty primary nodes 73 (only one is labelled in the figure) via a connection 72 (again, only one is labelled in the figure). Each of the connections 72 has an associated weighting factor x which is set by the training process. The value at each of the primary nodes is calculated by summing the products of each of the input nodes values and the associated weighting factor. The value output from each of the primary nodes is obtained by carrying out a non-linear function on the primary node value. In the present case this non-linear function is a sigmoid.

The output from the each of the primary nodes 73 is connected via connections 74 (again, each one has an associated weighting factor) to one of eight secondary nodes 75. The secondary node values are calculated on the basis of the primary node values using a method similar to that used to calculate the primary node values on the basis of the input node values. The output of the secondary nodes is again modified using a sigmoid function. Each of the eight secondary nodes 75 is connected to the output node 77 via a respective connection 76. The value at the output node is calculated on the basis of the outputs from the secondary nodes 75 in a similar way to the way in which the secondary node values are calculated on the basis of the outputs from the primary nodes. The value at the output node is a single floating point value lying between 0 and 1. If this value is greater than 0.5 then the decision 79 output by the voice activity detector indicates that the current input signal frame comprises speech, otherwise the decision 79 indicates that the input signal frame consists only of noise. It will be realised that the decision 79 forms the output of the main voice activity detector (FIG. 1).

In an alternative embodiment, the multilayer perceptron is provided with a second output node which indicates whether the input signal frame comprises information tones (such as a dial tone, an engaged tone or a DTMF signalling tone).

In order to reduce speech clipping, the output decision may only indicate that the input signal frame consists of noise if the output node value exceeds 0.5 for the current input signal frame and exceeded 0.5 for the previous input signal frame.

In some embodiments, the voice activity detector may be disabled from outputting a decision to the effect that an input signal frame consists of noise for a short initial period (e.g. 1s).

Figure 5:
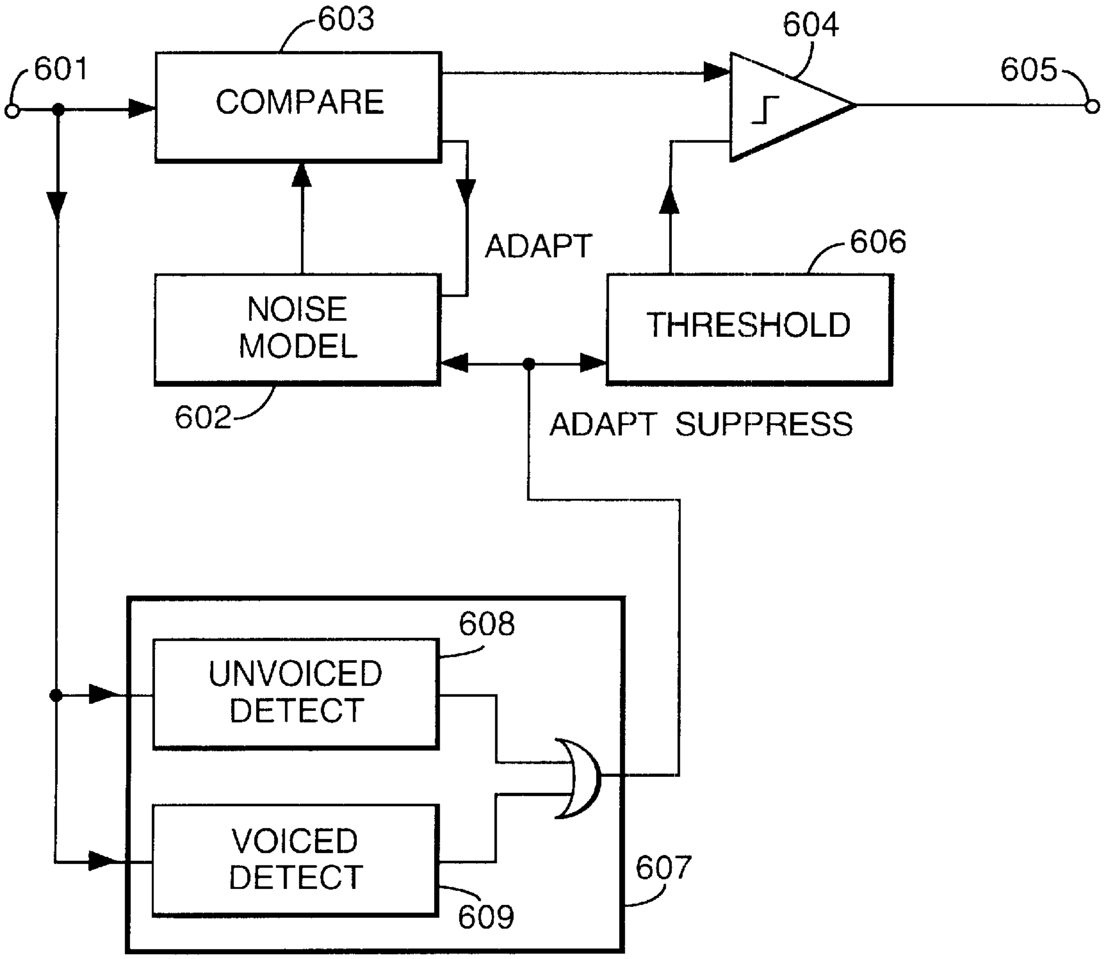
FIG. 5 is a block diagram of a known voice activity detector.

A second embodiment of the present invention provides an improved version of auxiliary voice detector defined in the standards document: 'European Digital Cellular Telecommunications (phase 2); Voice Activity Detector (VAD) (GSM 06.32) ETS 300 580-6'. This corresponds to the Voice Activity Detector described in our European Patent 0 335 521 which is illustrated in FIG. 5.

Noisy speech signals are received at an input 601. A store 602 contains data defining an estimate or model of the frequency spectrum of the noise; a comparison is made (603) between this and the spectrum of the current signal to obtain a measure of similarity which is compared (604) with a threshold value. In order to track changes in the noise component, the noise model is updated from the input only when speech is absent. Also, the threshold can be adapted (adaptor 606).

In order to ensure that adaptation occurs only during noise-only periods, without the danger of progressive incorrect adaptation following a wrong decision, adaptation is performed under the control of an auxiliary detector 607, which comprises an unvoiced speech detector 608 and a voiced speech detector 609: the detector 607 deems speech to be present if either of the detectors recognises speech, and suppresses updating and threshold adaptation of the main detector. The unvoiced speech detector 608 obtains a set of LPC coefficients for the signal and compares the autocorrelation function of these coefficients between successive frame periods, whilst the voiced speech detector 609 examines variations in the autocorrelation of the LPC residual.

In the unvoiced speech detector 608, a measure of the spectral stationarity of the signal is used to form the decision as to whether the input signal comprises unvoiced speech. More specifically, the interframe change in a measure of the spectral difference between adjacent 80 ms blocks of the input signal is compared to a threshold to produce a Boolean stationarity decision. The spectral difference measure used is a variant of the Itakura-Saito distortion measure, the spectral representation of each 80 ms block being derived by averaging the autocorrelation functions of the constituent 20 ms frames. The second embodiment of the present invention improves the reliability of this decision.

According to the second embodiment of the present invention, a signal block to be analysed is divided into a number of sub-blocks, e.g. a 160 ms block divided into eight 20 ms sub-blocks. The unvoiced speech/noise decision is then determined by calculating a spectral distance measure between all the combinations of sub-blocks pairs (${}_8C_2$=28 comparisons in this example), and summing the individual distance measures to form a single metric. The resultant metric is a measure of the spectral stationarity of the block being analysed. This measure of stationarity is more accurate than the one described in the above-referenced GSM standard because it considers the spectral similarity between pairs of sub-blocks, the constituents of which are spaced at different intervals (20 ms, 40 ms, 60 ms . . . 140 ms) rather than just the similarity between adjacent blocks. This method could be easily incorporated into the above GSM VAD, since the variant of Itakura-Saito Distortion Measure can be calculated from the auto-correlation function available for each 20 ms signal frame. It will be realised by those skilled in the art that other spectral measures, such as FFT based methods, could also be used. Also, a weighted combination of the distortion measures could be used in deriving the single metric referred to above. For example, the distortion measures could be weighted in proportion to the spacing between the sub-blocks used in their derivation.

What is claimed is:

1. An apparatus comprising:

means arranged in operation to calculate at least one first spectral difference measure indicative of the degree of spectral similarity in a pair of time segments of a signal, one of the time segments of the pair lagging the other by a first time interval;

means arranged in operation to calculate at least one second spectral difference measure indicative of the degree of spectral similarity in a pair of time segments of the signal, one of the time segments of the pair lagging the other by a second time interval which differs from said first time interval;

means arranged in operation to calculate a spectral irregularity measure on the basis of at least said first and second spectral difference measures;

means arranged in operation to compare said spectral irregularity measure with a threshold measure; and means arranged in operation to determine whether the signal comprises of noise on the basis on the comparison.

2. An apparatus according to claim 1 wherein said first and second time intervals are in the range 80 ms to 1 s.

3. An apparatus according to claim 1 wherein said spectral irregularity measure calculating means is arranged in operation to calculate a weighted sum of said spectral difference measures.

4. A voice activity detector including an apparatus according to claim 1 operable as an auxiliary voice activity detector.

5. A voice activity detector according to claim 4 further comprising:

means arranged in operation to provide an estimated noise spectrum on the basis of one or more spectra obtained from respective time segments determined to comprise of noise by said auxiliary voice activity detector; and means arranged in operation to subtract said estimated noise spectrum from spectra obtained from subsequent time segments of said signal.

6. A mobile radio apparatus including an apparatus according to claim 1.

7. A noise suppression apparatus comprising:

means arranged in operation to calculate at least one first spectral difference measure indicative of the degree of spectral similarity in a pair of time segments of a signal, one of the time segments of the pair lagging the other by a first time interval;

means arranged in operation to calculate at least one second spectral difference measure indicative of the degree of spectral similarity in a pair of time segments of the signal, one of the time segments of the pair lagging the other by a second time interval which differs from said first time interval;

means arranged in operation to calculate a spectral irregularity measure on the basis of at least said first and second spectral difference measures;

means arranged in operation to compare said spectral irregularity measure with a threshold measure;

means arranged in operation to provide an estimated noise spectrum on the basis of one or more spectra obtained from respective time segments determined to comprise of noise; and means arranged in operation to subtract said estimated noise spectrum from spectra obtained from subsequent time segments of said signal.

8. A voice activity detector comprising:

means arranged in operation to extract feature values from an input signal;

neural net means arranged in operation to process a plurality of said feature values to output a value indicative of whether said input signal comprises of noise;

means arranged in operation to calculate at least one first spectral difference measure indicative of the degree of spectral similarity in a pair of time segments of a signal, one of the time segments of the pair lagging the other by a first time interval;

means arranged in operation to calculate at least one second spectral difference measure indicative of the degree of spectral similarity in a pair of time segments of the signal, one of the time segments of the pair lagging the other by a second time interval which differs from said first time interval;

means arranged in operation to calculate a spectral irregularity measure on the basis of at least said first and second spectral difference measures; and means arranged in operation to compare said spectral irregularity measure with a threshold measure;

means arranged in operation to provide an estimated noise spectrum on the basis of one or more spectra obtained from respective time segments determined to comprise of noise by said voice activity detector; and means arranged in operation to subtract said estimated noise spectrum from spectra obtained from subsequent time segments of said signal.

9. A method comprising:

calculating at least one first spectral difference measure indicative of the degree of spectral similarity in a pair of time segments of a signal, one of the time segments of the pair lagging the other by a first time interval;

calculating at least one second spectral difference measure indicative of the degree of spectral similarity in a pair of time segments of the signal, one of the time segments of the pair lagging the other by a second time interval which differs from said first time interval;

calculating a spectral irregularity measure on the basis of at least said first and second spectral difference measures;

comparing said spectral irregularity measure with a threshold measure; and determining whether said signal comprises of noise on the basis of the comparison.

10. A method according to claim 9 wherein said first and second time intervals are in the range 80 ms to 1 s.

11. A method according to claim 9 wherein said spectral irregularity measure calculation involves forming a weighted sum of said spectral difference measures.

12. A method of enhancing a spectrum representing the value of a predetermined spectral characteristic at a succession of predetermined frequencies said enhancement comprising the steps of:

for each of said predetermined frequencies, comparing the value of said spectral characteristic at said frequency with the value of said characteristic at neighboring frequencies and calculating an adjustment to said predetermined frequency spectral value, said calculation being such that the adjustment is increased on said predetermined frequency spectral value being greater than either of said neighboring frequency spectral values and is decreased on said predetermined frequency spectral value being less than either of said neighboring frequency spectral values; and adjusting each of said spectral values within the spectrum in accordance with said calculated adjustment.

13. A method according to claim 12 wherein said comparison comprises:

obtaining said predetermined frequency spectral value;

obtaining the value of said characteristic at an adjacent lower frequency;

obtaining the value of said characteristic at an adjacent higher frequency;

calculating a downward decrease amount on said predetermined frequency spectral value exceeding said lower frequency spectral value;

calculating an upward decrease amount on said predetermined frequency spectral value exceeding said higher frequency spectral value;

calculating a downward increase amount on said predetermined frequency spectral value being less than said lower frequency spectral value;

calculating an upward increase amount on said predetermined frequency spectral value being less than said higher frequency spectral value;

said adjustment calculation being such that said adjustment is increased on the basis of any decrease amount calculated and/or decreased on the basis of any increase amount calculated.

14. A method according to claim 13 wherein said adjusting step comprises:

increasing said predetermined frequency value by an amount linearly proportional to any decrease amount calculated; and/or decreasing said predetermined frequency value by an amount linearly proportional to any increase amount calculated.

15. A method according to claim 12 comprising repeating all its steps a plurality of times.

16. A method comprising enhancing a spectrum in accordance with claim 12.

17. An apparatus comprising:

a calculator which calculates a spectrum on the basis of a time segment of the signal and arranged in operation to calculate a first spectrum on the basis of a first time segment of the signal and a second spectrum on the basis of a second time segment of a signal, said second segment lagging said first segment by a predetermined length of time;

a calculator which calculates a spectral difference measure between spectra and arranged in operation to calculate a spectral difference measure indicative of the spectral difference between said first and second spectra;

a spectral irregularity measure calculator arranged in operation to calculate a spectral irregularity measure on the basis of at least said spectral difference measures; and a comparator which compares said spectral irregularity measure with a threshold measure;

wherein said predetermined length of time is sufficiently great to reveal the time-varying character of speech signal spectra;

said spectrum calculator is further arranged in operation to calculate one or more intermediate spectra on the basis of the time segments of said signal falling within said predetermined length of time;

said spectral difference calculator is further arranged in operation to calculate intermediate spectral difference measures between some or all of said intermediate spectra and said first and second spectra; and said spectral irregularity measure calculator is arranged in operation to calculate the spectral irregularity measure on the basis of said spectral difference measure and said intermediate spectral difference measures.

* * * * *